US006778663B1

(12) United States Patent
Schopfer

(10) Patent No.: US 6,778,663 B1
(45) Date of Patent: Aug. 17, 2004

(54) METHOD AND APPARATUS FOR SENSING CURRENT

(75) Inventor: Walter S. Schopfer, Austin, TX (US)

(73) Assignee: Legerity, Inc., Austin, TX (US)

(*) Notice: Subject to any disclaimer, the term of this patent is extended or adjusted under 35 U.S.C. 154(b) by 0 days.

(21) Appl. No.: 09/527,768

(22) Filed: Mar. 17, 2000

(51) Int. Cl.[7] .............................................. H04M 1/00
(52) U.S. Cl. .................. 379/377; 379/399.01; 379/413
(58) Field of Search .......................... 379/399.01, 413, 379/413.01, 413.02, 403, 400, 377, 401, 404, 387.01, 388.03, 390.01, 390.03, 392.01, 394, 395, 398

(56) References Cited

U.S. PATENT DOCUMENTS

| 4,406,929 | A |   | 9/1983 | Pace et al. |
| 5,289,359 | A | * | 2/1994 | Ziermann .................... 379/413 |
| 5,424,662 | A | * | 6/1995 | Bonaccio ..................... 327/55 |
| 6,226,696 | B1 | * | 5/2001 | Lin et al. ....................... 710/8 |
| 6,636,116 | B2 | * | 10/2003 | Cameron ..................... 330/260 |

OTHER PUBLICATIONS

International Search Report dated Jun. 6, 2002 for International application No. PCT/US01/07995 Filed Mar. 3, 2001.

* cited by examiner

Primary Examiner—Rexford Barnie
(74) Attorney, Agent, or Firm—Williams, Morgan & Amerson, P.C.

(57) ABSTRACT

A method and apparatus are provided for sensing current in a subscriber line. The method includes receiving a current signal from a driver capable of driving the current signal on the subscriber line, and generating a second signal in response to receiving the current signal, wherein the second signal is proportional to the current signal. The method includes receiving at least a portion of the current signal from a driver capable of sinking the portion of the current signal from the subscriber line, and generating a third signal in response to receiving at least the portion of the current signal, wherein the third signal is proportional to the portion of the current signal. The method further includes adding the second signal and the third signal to generate an output signal.

25 Claims, 6 Drawing Sheets

METHOD AND APPARATUS FOR SENSING CURRENT

BACKGROUND OF THE INVENTION

1. Field of the Invention

This invention relates generally to telecommunications, and, more particularly, to a method and apparatus for sensing current in a subscriber line card.

2. Description of the Related Art

In communications systems, particularly telephony, it is a common practice to transmit signals between a subscriber station and a central switching office via a two-wire bi-directional communication channel. A line card generally connects the subscriber station to the central switching office through a subscriber line. At the subscriber end, a telephonic device may be employed to establish communication with a remote user using the subscriber line. The combination of the telephonic device and the subscriber line is commonly referred to as a subscriber loop.

A line card generally includes at least one subscriber line interface circuit (SLIC) as well as a subscriber line audio-processing circuit (SLAC). The primary functions of the line card may include supplying talk battery, performing impedance matching, determining whether telephonic equipment is on-hook or off-hook, and handling ringing signals, voice signals, and testing signals.

Typically, a line card senses voice currents on the subscriber line by amplifying the voltage drops across resistors (commonly referred to as "sense resistors") in series with the line driver. This technique, however, has at least one shortcoming in that the sense resistors create an excessive voltage drop in the subscriber loop, especially if large sense resistors are employed. Furthermore, handling these large voltage drops across sensing resistors requires use of voltage amplifiers, which require larger current draw from a battery supply or other such circuitry. One way to avoid the large voltage drops is to utilize smaller sense resistors. However, when smaller sense resistors are employed, the available signal is also small, thereby making the available signal more susceptible to noise.

The present invention is directed to overcoming, or at least reducing the effects of, one or more of the problems set forth above.

SUMMARY OF THE INVENTION

In one aspect of the present invention, a method is provided for sensing current in a subscriber line. The method includes receiving a current signal from a driver capable of driving the current signal on the subscriber line, and generating a second signal in response to receiving the current signal, wherein the second signal is proportional to the current signal. The method includes receiving at least a portion of the current signal from a driver capable of sinking the portion of the current signal from the subscriber line, and generating a third signal in response to receiving at least the portion of the current signal, wherein the third signal is proportional to the portion of the current signal. The method further includes adding the second signal and the third signal to generate an output signal.

In another aspect of the present invention, a circuit is provided for sensing current in a subscriber line. The apparatus includes an output driver adapted to drive a current signal on the subscriber line, and first circuitry coupled to the output driver and adapted to generate a second signal in response to receiving the current signal, wherein the second signal is proportional to the current signal. The circuit includes second circuitry adapted for receiving at least a portion of the current signal, and third circuitry coupled to the second circuitry and adapted to generate a third signal in response to receiving at least the portion of the current signal, wherein the third signal is proportional to the portion of the current signal. The circuit further includes fourth circuitry capable of adding the second signal and the third signal to generate an output signal.

BRIEF DESCRIPTION OF THE DRAWINGS

The invention may be understood by reference to the following description taken in conjunction with the accompanying drawings, in which like reference numerals identify like elements, and in which.

Figure 1:
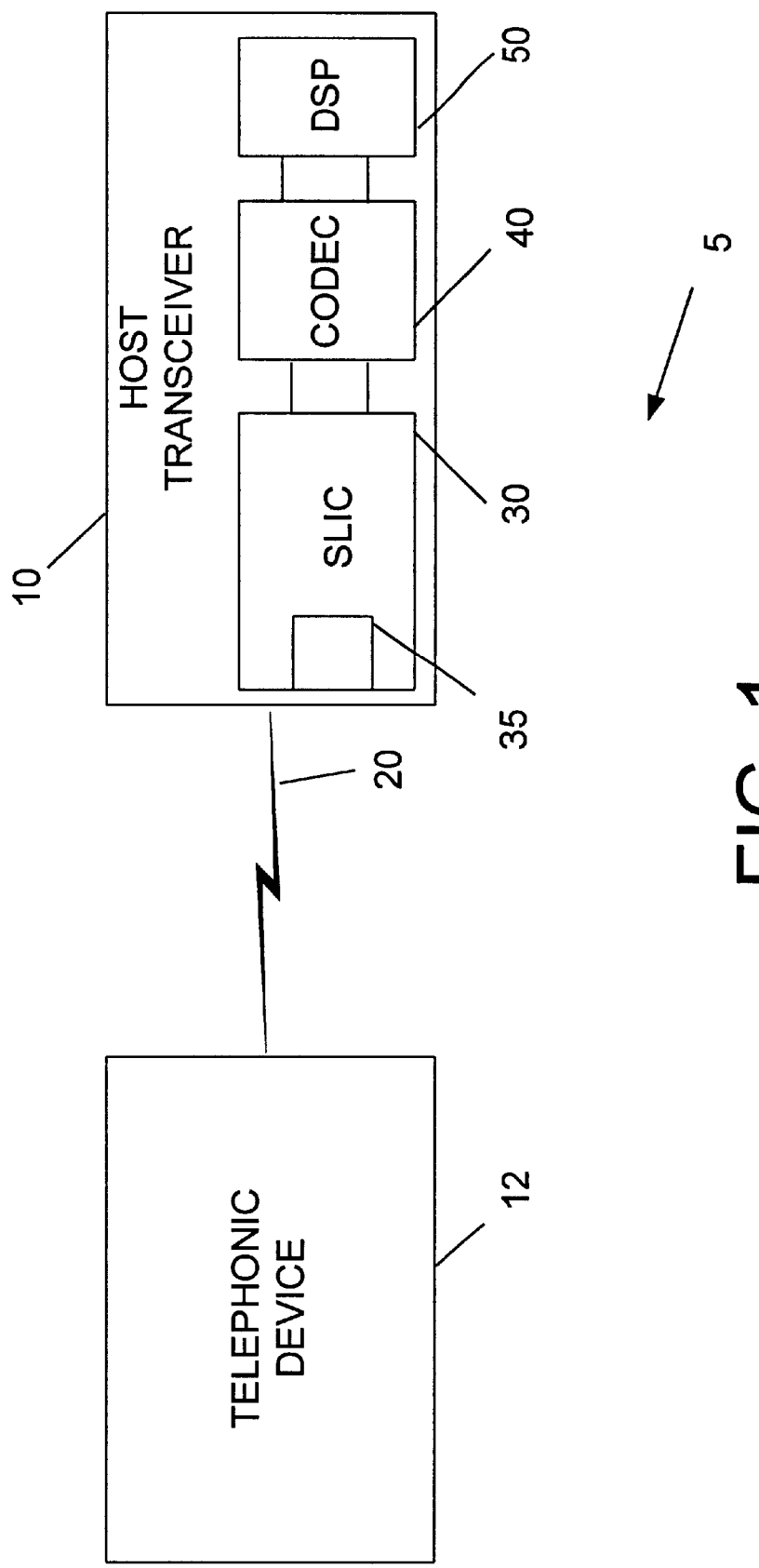
FIG. 1 illustrates a communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring first to FIG. 1, a simplified block diagram of a communications system 5 in accordance with the present invention is provided. The communications system 5 includes a line card 10 that interfaces with a telephonic device 12 over a subscriber line 20. In an actual implementation, the line card 10 interfaces with a plurality of subscriber lines 20, but for clarity and ease of illustration, only one is shown. A subscriber line interface circuit (SLIC) 30 is coupled to the subscriber line 20. The SLIC 30 includes a line driver and current sensing circuit 35 adapted to sense the current received over the subscriber line 20. Hereinafter, signals received by the line card 10 over the subscriber line 20 are referred to as upstream signals, and signals transmitted by the line card 10 on the subscriber line 20 are referred to as downstream signals.

The SLIC supplies an analog upstream signal to a coder/decoder (CODEC) 40. The CODEC 40 receives the analog upstream signal from the SLIC 30 and generates a digital upstream signal that is subsequently passed to a digital signal processor (DSP) 50. The DSP 50 also provides a digital signal for eventual transmission on the subscriber line 20. The CODEC 40 receives the digital signal, converts it to an analog signal, and provides the analog signal to the SLIC 30, which sends the analog signal over the subscriber line 20.

In the illustrated embodiment, the line card 10, in addition to supporting plain old telephone service (POTS), is adapted to implement an asynchronous digital subscriber line (ADSL) modem for high bandwidth data transfer. The ADSL protocol is described in ANSI T1.413 Issue 2, entitled, "Interface Between Networks and Customer Installation—Asymmetric Digital Subscriber Line (ADSL) Metallic Interface." The SLIC 30 of the line card 10 is capable of performing a variety of functions, such as battery feed, overload protection, polarity reversal, on-hook transmission, and current limiting. Only relevant portions of the SLIC 30, CODEC 40, and DSP 50 are described herein, although those of ordinary skill in the art will appreciate that these devices may perform other functions that are not described in this disclosure.

The telephonic device 12 may comprise a telephone or any other device capable of providing a communication link between at least two users. In one embodiment, the telephonic device 12 may be one of a variety of available conventional telephones, such as wired telephones and similar devices. In an alternative embodiment, the telephonic device 12 may be any device capable of performing a substantially equivalent function of a conventional telephone, which may include, but is not limited to, transmitting and/or receiving voice and data signals. Examples of the telephonic device 12 include a data processing system (DPS) utilizing a modem to perform telephony, a television phone, a wireless local loop, a DPS working in conjunction with a telephone, Internet Protocol (IP) telephony, and the like. IP telephony is a general term for the technologies that use the Internet Protocol's packet-switched connections to exchange voice, fax, and other forms of information that have traditionally been carried over the dedicated circuit-switched connections of the public switched telephone network (PSTN). One example of IP telephony is an Internet Phone, a software program that runs on a DPS and simulates a conventional phone, allowing an end user to speak through a microphone and hear through DPS speakers. The calls travel over the Internet as packets of data on shared lines, avoiding the tolls of the PSTN.

Figure 2:
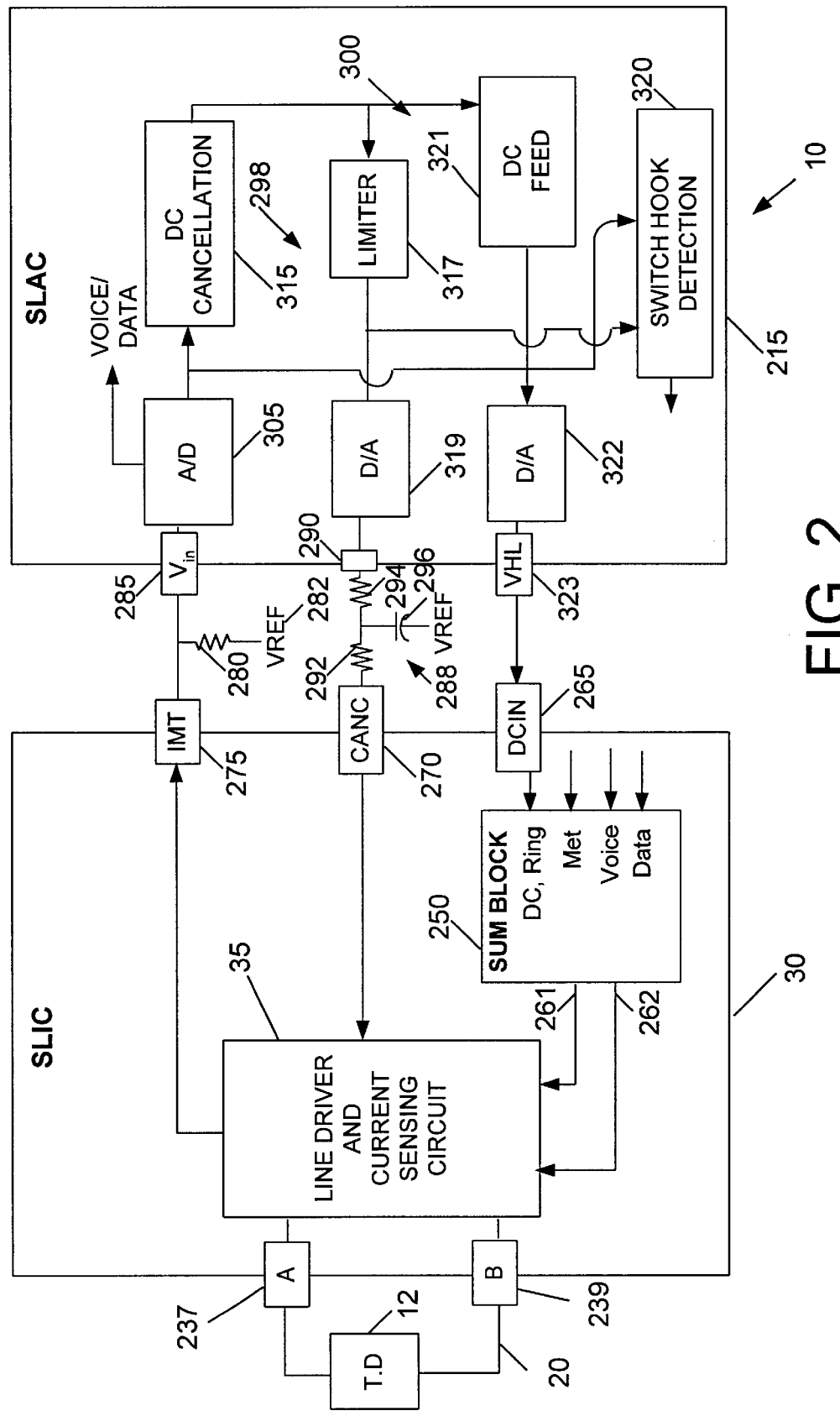
FIG. 2 depicts a block diagram of an embodiment of a line card in accordance with the present invention that may be implemented in the communications system of FIG. 1.

FIG. 2 illustrates one embodiment of the line card 10 in accordance with the present invention. Specifically, the line card 10 includes the SLIC 30, which, in the illustrated embodiment, is a voltage-feed SLIC. The line card 10 also includes the CODEC/DSP 40, 50, which in the illustrated embodiment are shown as a subscriber line audio-process circuit (SLAC) 215 that integrates the functions of both the CODEC and DSP 40, 50. The line card 10 may be located at a central office or a remote location somewhere between the central office and the telephonic device 12 (see FIG. 1). The line card 10 interfaces with the telephonic device 12 through tip and ring terminals 237, 239 at the SLIC 30. The combination of the telephone device 12 and the subscriber line 20 is generally referred to as a subscriber loop.

The line card 10, which may be capable of supporting a plurality of subscriber lines 20, performs, among other things, two fundamental functions: DC loop supervision and DC feed. The purpose of DC feed is to supply enough power to operate the telephone device 12 at the customer end. The purpose of DC loop supervision is to detect changes in DC load, such as on-hook events, off-hook events and rotary dialing, or any other event that causes the DC load to change. In the interest of clarity and to avoid obscuring the invention, only that portion of the line card 10 that is helpful to the understanding of the invention is illustrated.

The SLIC 30 includes the line driver and current sensing circuit 35 and a sum block 250. The sum block 250 is capable of receiving a DC feed signal (as well as a ringing signal), a voice signal, a metering signal, and a data signal from a DCIN terminal 265 of the SLIC. The sum block 250 is capable of adding one or more of the received signals and providing it to the line driver and current sensing circuit 35 through a first output terminal 261 and a second output terminal 262. The signals into the SUM block 250 may be subjected to different levels of gain for optimal performance. The signal from the DCIN terminal 265 is low-pass filtered.

The line driver and current sensing circuit 35 drives voltages to the subscriber line 20 and senses current flow in the subscriber line 20. The line driver and current sensing circuit 35 of the SLIC 30 interfaces with the telephonic device 12 via tip and ring terminals 237, 239. The line driver and current sensing circuit 35 is capable of producing a current proportional to line current, subtracting a current proportional to a current from a cancellation terminal (CANC) 270, and providing the resulting current to an IMT terminal 275 of the SLIC 30. In one embodiment, the constant of proportionality for the current from the cancellation terminal (CANC) 270 is unity, and the constant of proportionality for the metallic line current is 0.001. Those skilled in the art will appreciate that only those portions of the SLIC 30 relevant to the invention are disclosed herein. The SLIC 30 may employ resistors or other circuitry that is not illustrated in FIG. 2. The line driver and current sensing circuit 35 is described in more detail below in reference to FIG. 3.

The SLIC 30 is connected to the SLAC 215 as well as to an external resistor 280. A first terminal of the resistor 280 is coupled to the IMT terminal 275 of the SLIC 30, as well as to the VIN terminal 285 of the SLAC 215. A second terminal of the resistor 280 is coupled to a reference voltage node 282. In one embodiment, the reference voltage node 282 delivers a voltage in the range of about 1.4 volts. The external resistor 280 converts the current flowing from the IMT terminal 275 to a voltage for the SLAC 215. Although not necessary, the resistor 280 is external in the illustrated embodiment because in some embodiments it may be useful for the drive value of the resistor to be relatively precise and because each line card 10 may require different values.

A discrete network 288 couples the SLIC 30 to the SLAC 215 via the CANC terminals 270, 290. The discrete network 288 includes a first and second resistor 292, 294 and a capacitor 296. A first terminal of the first resistor 292 is coupled to the CANC terminal 270 of the SLIC 30 and a second terminal of the first resistor 292 is coupled to a first terminal of the second resistor 294. The second terminal of the second resistor 294 is coupled to the CANC terminal 290 of the SLAC 215. The capacitor 296 is coupled between the second terminal of the first resistor 292 and the reference voltage node 282. The discrete network 288 acts as a low pass filter and converts the voltage output signal from the SLAC 215 to a current and provides it to the SLIC 30.

The SLAC 215 interfaces with the telephonic device 12 through the SLIC 30 and over the subscriber line 20. The SLAC 215 includes two feedback loops: a DC cancellation loop 298 and a DC feed loop 300. In the illustrated embodiment, the two loops 298, 300 are implemented within a digital signal processor (DSP). Only those portions of the SLAC 215 relevant to the instant invention are described herein, albeit the SLAC 215 may perform a variety of other unrelated functions that are not illustrated in FIG. 2.

The DC cancellation loop 298 includes an analog-to-digital converter 305, DC cancellation logic 315, a current limiter 317, and a digital-to-analog converter 319. In the illustrated embodiment, to reduce hardware complexity, the voice and DC components of the input signal from the VIN terminal 285 share the same analog-to-digital converter 305. The analog-to-digital converter 305 and digital-to-analog converter 319 include a decimator and interpolator, respectively. The analog-to-digital converter 305 in the illustrated embodiment is capable of providing two output signals, the first output signal is sampled at a 4 KHz frequency and is provided as a digital signal to the DC cancellation logic 315, as well as to switch hook detection logic 320. The second output signal of the analog-to-digital converter 305, comprising voice and/or data components, is sampled at 32 KHz and is provided to a CODEC (not shown). The DC cancellation logic 315 receives the digital signal from the analog-to-digital converter 305, filters high frequencies, and provides a substantially DC signal. The DC signal is provided as an input to the DC feed logic 321, as well as to the current limiter 317. The output of the current limiter 317 is converted to an analog signal and then provided back to the SLIC 30 via the CANC terminal 270. The output of the current limiter 317 is also provided to the switch hook detection logic 320 for switch hook detection during pulse dialing. The current provided to the CANC terminal 270 of the SLIC 30 is used to cancel the DC component of the signal from the line driver and current sense circuit 35.

The DC feed loop 300, in addition to the analog-to-digital converter 305 and DC cancellation logic 315, includes DC feed logic 321 and a digital-to-analog converter 322. In the illustrated embodiment, it is presumed that the digital-to-analog converter 322 may also interpolate. The output from the digital-to-analog converter 322 is provided to a DCIN terminal 265 of the SLIC 30 via VHL terminal 323 of the SLAC 215. The DC feed logic 321 is capable of providing high DC voltage to the subscriber loop so that sufficient current (20–60 mA) can be driven through a resistance as high as 2K ohms.

Figure 3:
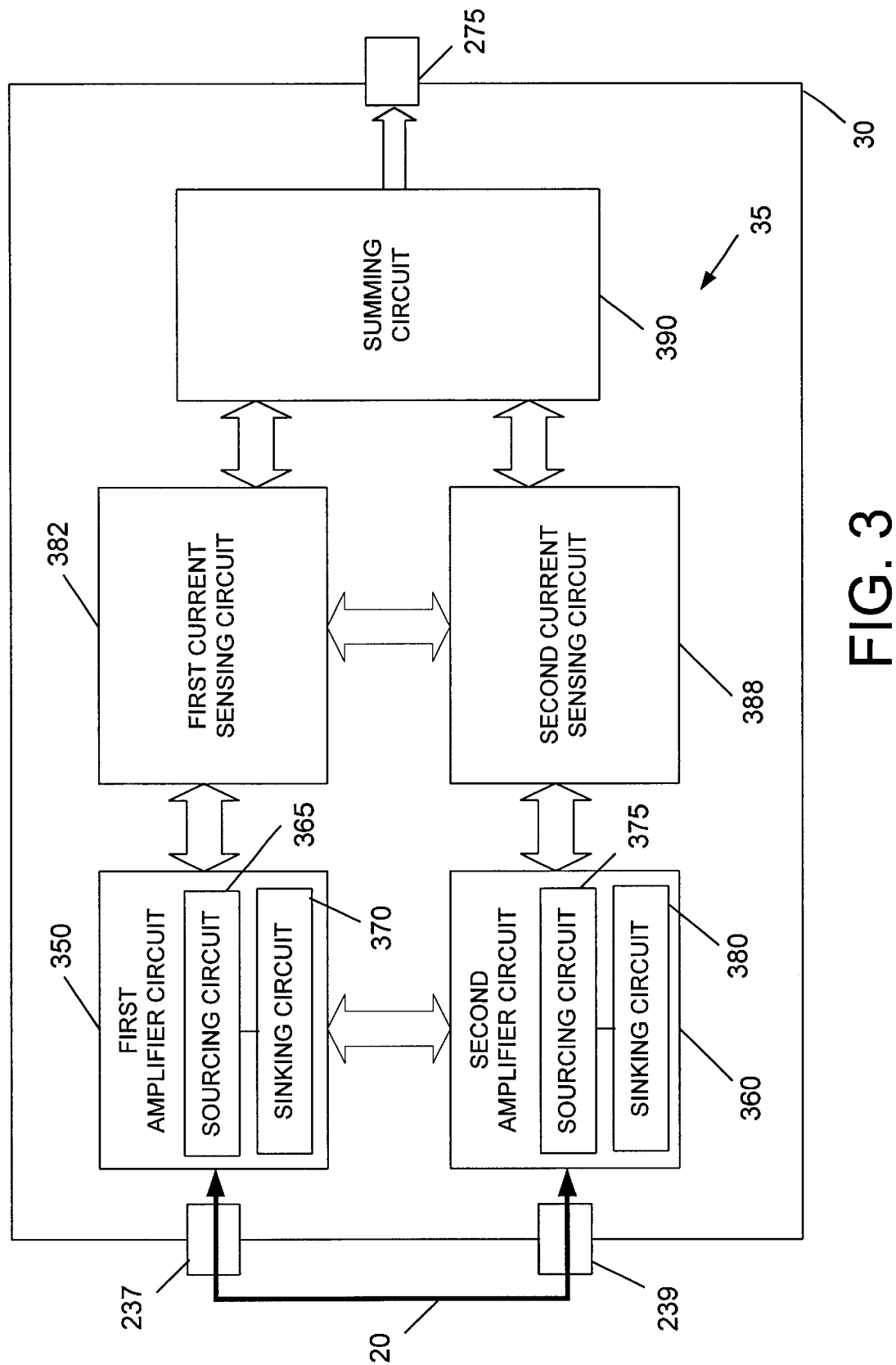
FIG. 3 illustrates a block diagram of an embodiment of a line driver and current sensing circuit that may be employed by the line card of FIG. 2.
Figure 4:
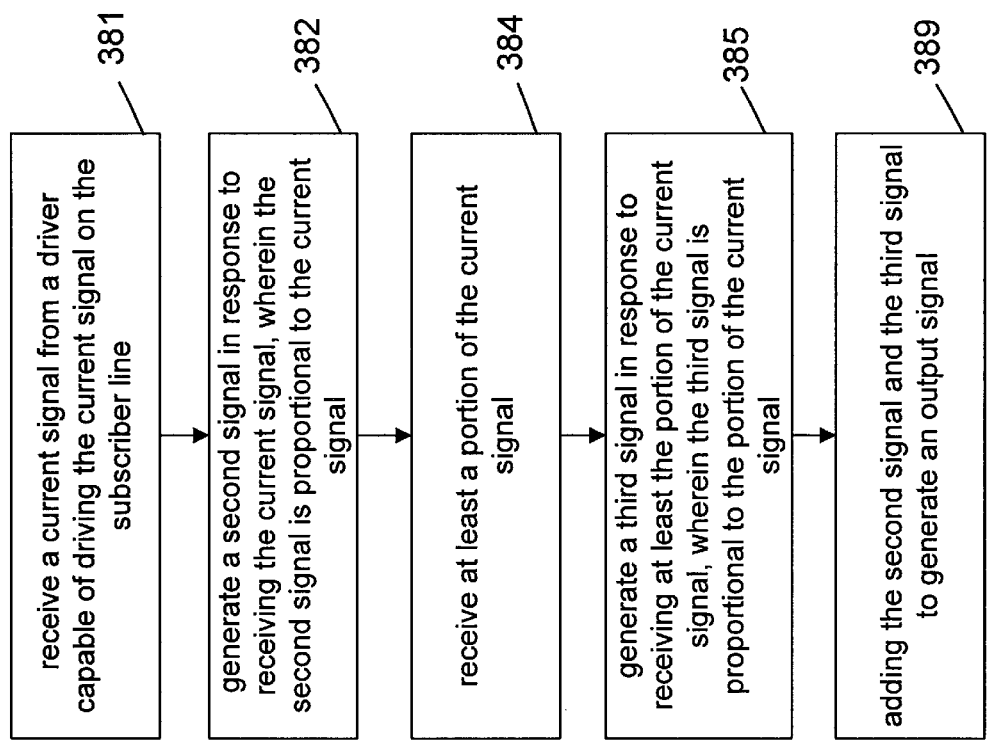
FIG. 4 illustrates a method in accordance with the present invention that may be implemented by the line card of FIG. 2.

Referring now to FIGS. 3 and 4, FIG. 3 illustrates one embodiment of the line driver and current sensing circuit 35 that may be employed in the line card 10 of FIG. 2. FIG. 4 illustrates one embodiment of a method in accordance with the present invention that may be employed by the line driver and current sensing circuit 35 of FIG. 3. The line driver and current sensing circuit 35 includes a first and second amplifier circuit 350, 360 that are adapted to drive signals on the subscriber line 20 via the tip and ring terminal 237, 239, respectively, of the SLIC 30. The first amplifier circuit 350 includes a sourcing circuit 365 and a sinking circuit 370. Likewise, the second amplifier circuit 360 includes a sourcing circuit 375 and a sinking circuit 380. Generally, as the sourcing circuit 365 of the first amplifier circuit 350 drives current on the subscriber line 20, the sinking circuit 380 of the second amplifier circuit 360 sinks the received current. And, similarly, as the sourcing circuit 375 of the second amplifier circuit 360 drives current on the subscriber line 20, the sinking circuit 370 of the first amplifier circuit 350 sinks the received current.

The method of FIG. 4 begins at block 381, where a driver (not shown) of the sensing circuit 365 of the first amplifier circuit 350 drives a current signal on the subscriber line 20 via the tip terminal 237 of the SLIC 30. A first current sense circuit 382 senses the current signal from the driver of the first amplifier circuit 350. At block 383, the first current sense circuit 382 generates a second signal in response to sensing the current signal, wherein the second signal is proportional to the current signal. Generally, the driver of the first amplifier circuit 350 provides a high level current signal, which is then proportionally reduced by the first current sense circuit 382 so that it can be more readily processed by the electrical components (not shown) of the first current sensing circuit 382 without saturation. The second signal is then provided to a summing circuit 390.

At block 384, the sinking circuit 380 of the second amplifier circuit 360 sinks at least a portion, if not all, of the current signal. At block 385, a second current sensing circuit 388 generates a third signal in response to receiving at least the portion of the current signal, wherein the third signal is proportional to the portion of the current signal. The second current sensing circuit 388 proportionally reduces the portion of the signal so that it can be more readily processed by the electrical components (not shown) of the second current sensing circuit 388 without saturation. The second signal is then provided to a summing circuit 390.

At block 389, the summing circuit 390 adds the second signal and the third signal and provides a resulting signal to the IMT terminal 275 of the SLIC 30. The IMT signal is subsequently utilized by the SLAC 215 to perform other desirable functions such as DC feed control, supervision control, and the like.

Figure 5A:
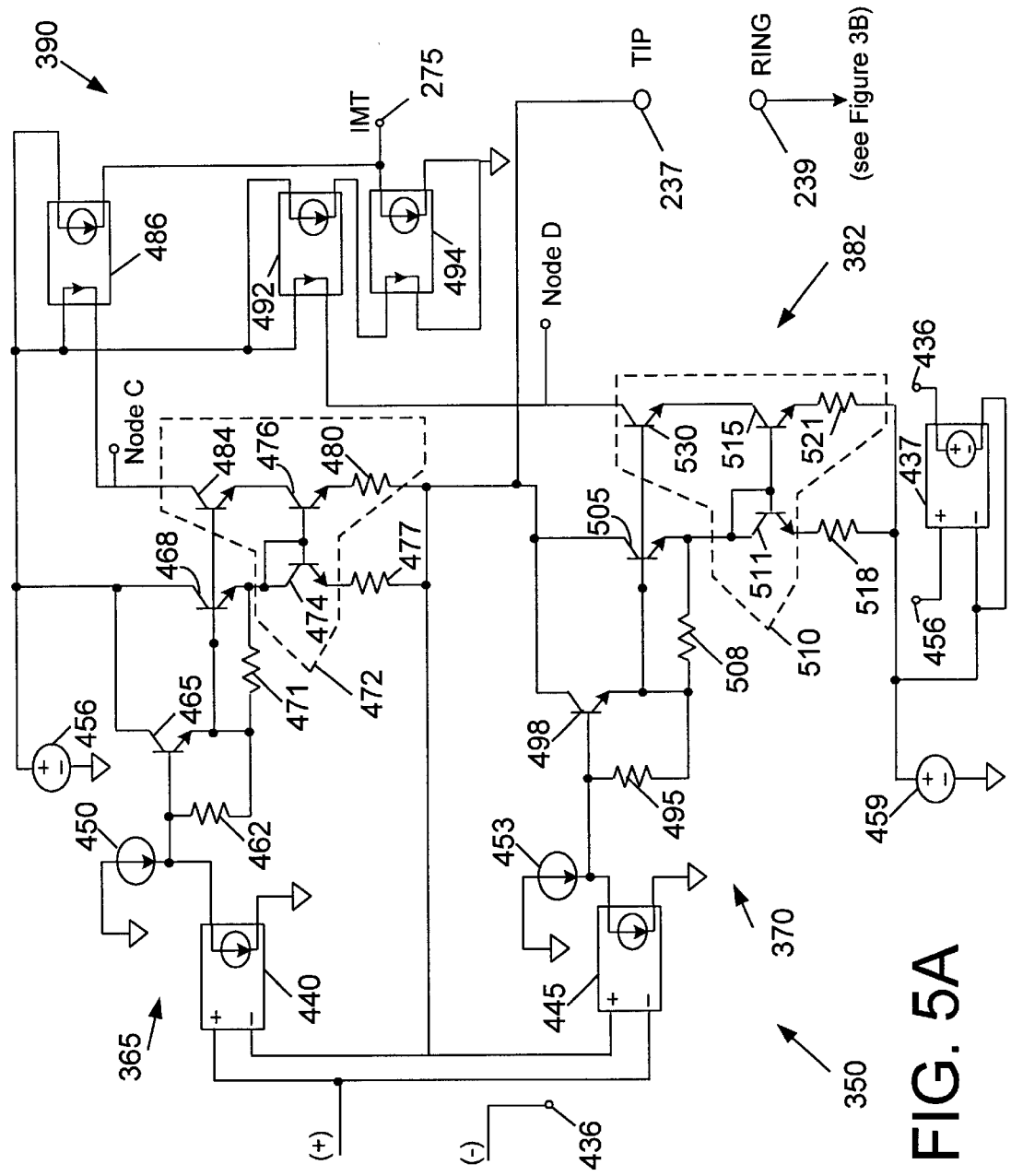
FIGS. 5A and 5B illustrate a specific embodiment of the line driver and current sensing circuit of FIG. 2.
Figure 5B:
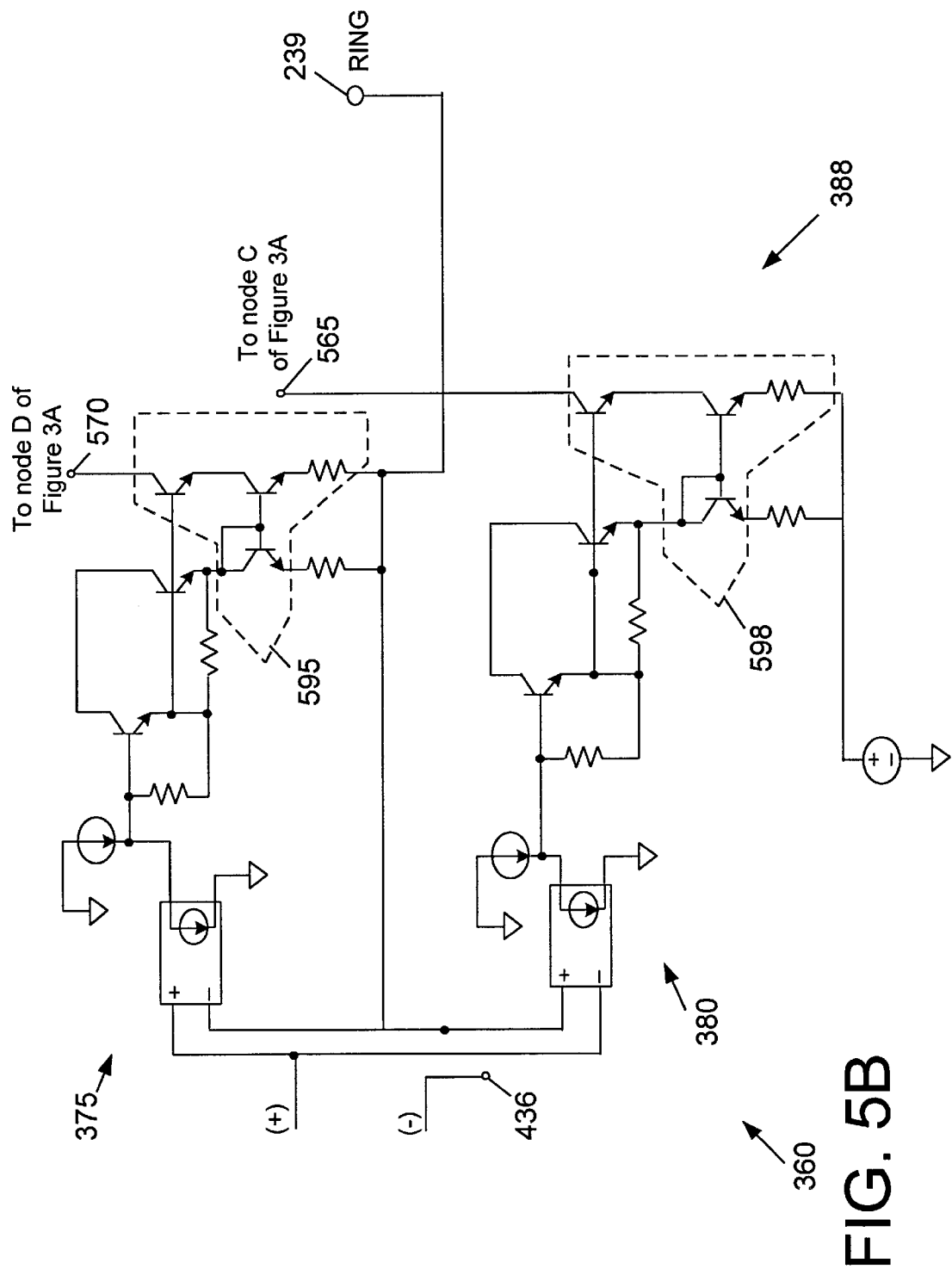

Turning now to FIGS. 5A and 5B, which, taken together, illustrate a specific embodiment of the line driver and current sensing circuit 35. The line driver and current sensing circuit 35 includes two amplifier circuits 350, 360, one for driving the tip terminal 237 and the other for driving the ring terminal 239. FIG. 5A illustrates an embodiment of the first amplifier circuit 350 having the sourcing circuit 365 and sinking circuit 370, both of which are further coupled to the first sensing circuit 382. FIG. 5B illustrates an embodiment of the second amplifier circuit 360 having the sourcing and sensing circuits 375, 380 that are further coupled to the second sensing circuit 388. The first and second sensing circuits 382, 388 are further coupled to the summing circuit 390.

The first amplifier circuit 350 of FIG. 5A operates in tandem with the second amplifier circuit 360 shown in FIG. 5B. The first amplifier circuit 350 includes the sourcing circuit 365 and the sinking circuit 370. Likewise, the second amplifier circuit 360 includes the sourcing circuit 375 and the sinking circuit 380. Generally, as the sourcing circuit 365 of the first amplifier circuit 350 drives current on the subscriber line 20, the sinking circuit 380 of the second amplifier circuit 360 sinks the received current. Conversely, when the sourcing circuit 375 of the second amplifier circuit 360 drives the current onto the subscriber line 20, the sinking circuit 370 of the first amplifier circuit 350 sinks the received current.

The first amplifier circuit 350 of the line driver and current sensing circuit 35 includes a non-inverting input terminal adapted to receive a signal from the first output terminal 261 at the sum block 250 (see FIG. 2) of the SLIC 30. The first amplifier circuit 350 also includes an inverting terminal that is coupled to an non-inverting output terminal 436 of a voltage divider 437. Likewise the second amplifier circuit 360 of the line driver and current sensing circuit 35 includes a non-inverting input terminal and an inverting input terminal, where the non-inverting input terminal is adapted to receive a signal from the second output terminal 262 of the sum block of the SLIC 30 and the inverting terminal is coupled to the non-inverting output terminal 436 of the voltage divider 437. The non-inverting terminals of the first and second amplifier circuits 350, 360 are referenced to a voltage level present at the non-inverting output terminal 436 of the voltage divider 437. Additionally, the signal at the non-inverting terminal of the first amplifier 350 is 180 degrees out of phase with the signal at the non-inverting terminal of the second amplifier circuit 360.

The first amplifier circuit 350 of the line driver and current sensing circuit 35 includes two high-gain amplifiers 440, 445 that provide adequate gain to stabilize the feedback loops of the first amplifier circuit 350. The first amplifier circuit 350 also includes current sources 450, 453 for properly biasing the sourcing and sinking circuits 365, 370, respectively. A first and second voltage source 456, 459 provide adequate power to the sourcing and sinking circuits 365, 370 of the first amplifier circuit 350, respectively. Although the voltages may vary from one implementation to another, in the instant embodiment the first voltage source 456 is 52 volts, and the second voltage source 459 is −68 volts.

The sourcing circuit 365 of the first amplifier circuit 350 includes a first resistor 462 coupled between a base terminal and emitter terminal of a first (NPN) transistor 465. A collector terminal of the first transistor is coupled to a collector terminal of a (NPN) second transistor 468 (i.e., the main driver of the sourcing circuit 365), and the emitter terminal of the first transistor 465 is coupled to a base terminal of the second transistor 468. The sourcing circuit 365 of the first amplifier circuit 350 includes a second resistor 471 that is coupled between the emitter terminals of the first and second transistors 465, 468.

The emitter of the second transistor 468 is further coupled to a first current mirror 472. The first current mirror 472 includes a third transistor 474 having its collector terminal coupled to the emitter terminal of the second transistor 468. A base terminal of the third transistor 474 is "diode-connected" to the collector terminal of the third transistor 468, as well as to a base terminal of a fourth transistor 476 of the first current mirror 472. It is "diode-connected" in the sense that a shorted collector and base terminal provides for a "diode" effect. A third resistor 477 is coupled between the emitter terminal of the third transistor 474 of the first current mirror 472 and the tip terminal of the SLIC 30. A fourth resistor 480 of the first current mirror 472 is coupled between an emitter terminal of the fourth transistor 476 and the tip terminal 237.

The first current mirror 472 includes a fifth transistor 484. A collector terminal of the fourth transistor 476 is coupled to an emitter terminal of the fifth transistor 484. A base terminal of the fifth transistor 484 of the first current mirror 472 is coupled to the emitter terminal of the first transistor 465. A collector terminal of the fifth transistor 484 is coupled to a second current mirror 486. The second current mirror 486 is coupled to a third current mirror 492, as well as to the IMT terminal 275 of the SLIC 30. The third current mirror 492 is further coupled a fourth current mirror 494.

The sinking circuit 370 is similar structurally to the sourcing circuit 365. The sinking circuit 370 of the first amplifier circuit 350 includes a first resistor 495 coupled between a base terminal of a first (NPN) transistor 498 an emitter terminal of the first transistor 498. A collector terminal of the first transistor 498 is coupled to a collector terminal of a (NPN) second transistor 505 (i.e., the main driver of the sinking circuit 370), and the emitter terminal of the first transistor 498 is coupled to a base terminal of the second transistor 505. The sinking circuit 370 of the first amplifier circuit 350 includes a second resistor 508 that is coupled between the emitter terminal of the first amplifier 498 and the emitter terminal of the second amplifier 505.

The emitter of the second transistor 505 of the sinking circuit 370 is coupled to a fifth current mirror 510. The fifth current mirror 510 includes a third transistor 511 having its collector terminal coupled to the emitter terminal of the second transistor 505. A base terminal of the third transistor 511 is "diode-connected" to the collector terminal of the third transistor 511, as well as to a base terminal of a fourth transistor 515. A third resistor 518 is coupled between the emitter terminal of the third transistor 511 of the fifth current mirror 510 and the second voltage source 459 of the SLIC 30. A fourth resistor 521 of the fifth current mirror 510 is coupled between an emitter terminal of the fourth transistor 515 and the second voltage source 459.

The fifth current mirror 510 includes a fifth transistor 530. A collector terminal of the fourth transistor 515 is coupled to an emitter terminal of a fifth transistor 530. A base terminal of the fifth transistor 530 is coupled to the emitter terminal of the first transistor 498. A collector terminal of the fifth transistor 530 of the fifth current mirror is coupled to the third current mirror 492. In the illustrated embodiment, the first current mirror 472 and fifth current mirror 510 comprise at least a portion of the first current sensing circuit 382. The operation of the current mirrors 472, 510 is described in more detail below.

The first amplifier circuit 350 includes the voltage divider 437. First and second inverting terminals of the voltage gain block 437 are coupled to each other. A first non-inverting terminal of the voltage divider 437 is coupled to the first voltage source 456, while the non-inverting output terminal 436 of the voltage divider 437 is coupled the inverting terminals of the first and second amplifier circuit 350, 360.

The construct of the second amplifier circuit 360 of the line driver and current sensing circuit 35, as shown in FIG. 5B, is similar to that of the first amplifier circuit 350, and, hence, the detailed description of the elements of the second amplifier circuit 360 have been omitted. The second current sensing circuit 388 includes current mirrors 595, 598 for sensing current from the sourcing circuit 375 and sinking circuit 380, respectively, of the second amplifier circuit 360.

FIG. 5B illustrates the interconnections between the first amplifier circuit 350 and the second amplifier circuit 360. Specifically, node 565 of the second current sensing circuit 388 is coupled to the collector terminal of the fifth transistor 530 (see FIG. 5A) of the fifth current mirror 510 as well as to the third current mirror 492. Additionally, node 570 of the second current sensing circuit 388 is coupled to the collector terminal of the fifth transistor 484 (see FIG. 5A) of the first current mirror 472 as well as to the second current mirror 486.

The line driver and current sensing circuit 35 of FIGS. 5A and 5B is capable of employing the method of FIG. 4 in accordance with the present invention. At the block 381, the second transistor 468 (i.e., the driver) of the first amplifier circuit 350 provides a current signal on the subscriber line 20 via the tip terminal 237 of the SLIC 30. In one embodiment, the second transistor 468 may have a current in the range of 0 to 60 mA flowing through its emitter terminal.

At the block 383, a portion of the current flowing through the third transistor 474 flows through the fourth transistor 476 since the collector terminal of third transistor 474 is shorted to the base terminal of the fourth transistor 476. Thus, in essence, the current flowing through the third transistor 474 is mirrored to the base terminal of the fourth transistor 476. One factor that controls the amount of current that is mirrored is the relative emitter area of the transistors 474, 476. Although not so limited, in the illustrated embodiment the relative emitter areas of the transistors 474, 476 are 80 and 2, respectively. Accordingly, since the ratio of the relative emitter areas of the third and fourth transistors 474, 476 is 4:1, about one-fourth of the current from the collector terminal of the third transistor 474 is mirrored to the fourth transistor 476. And, if about of one-fourth of the current is mirrored to the fourth transistor 476, then approximately the same amount of the current is drawn from the fifth transistor 484. The fifth transistor 484 in turn draws its current from the second current mirror 486, which then causes a proportional amount of current to flow into the IMT terminal 275 of the SLIC 30. The current induced by the fifth transistor to flow into the IMT terminal 275 depends on the gain of the second current mirror 486. In the illustrated embodiment, the gain is 0.1, although another gain value may be employed, depending on the implementation. Thus, with the gain of 0.1, approximately $1/40^{th}$ ($1/4 \times 0.1$) of the current from the collector of the third transistor 474 flows into the IMT terminal 275 of the SLIC 30.

At the block 384, the sinking circuit 380 of the second amplifier circuit 360 sinks at least a portion, if not all, of the current signal received from the subscriber line 20. At the block 385, the second current sensing circuit 388 generates a third signal in response to receiving at least the portion of the current signal, wherein the third signal is proportional to the portion of the current signal. That is, the current mirror 598 of the second sensing circuit 388 senses the current from the sinking circuit 380 of the second amplifier circuit 360 and provides a current that is proportional to the sensed current. In the illustrated embodiment, the current mirror 598 mirrors a current that is approximately one-fourth of the sensed current, thereby drawing approximately the same amount of current from the second current mirror 486. As the second current mirror 486 provides approximately one-fourth of the sensed current to the current mirror 598, the second current mirror 486 also mirrors a proportional amount of current that flows into the IMT terminal 275 of the SLIC 30. The current induced by the current mirror 598 to flow into the IMT terminal 275 depends on the gain of the second current mirror 486. In the illustrated embodiment, the gain is 0.1, thus, approximately $1/40^{th}$ ($1/4 \times 0.1$) of the current drawn by the current mirror 598 flows into the IMT terminal 275 of the SLIC 30.

At the block 389, since the current from the sourcing circuit 365 of the first amplifier circuit 350 and the current from the sinking circuit 380 of the second amplifier circuit 360 flow in the same direction, it is the sum of the two currents that is provided to the IMT terminal 275 of the SLIC 30. The signal from the IMT terminal 275 may be used by the SLAC to perform a variety of functions, such as loop supervision functions and DC feed control. The summation of the currents from the sensing and sinking circuits 365, 380 represents the metallic current. It is also possible to ascertain a longitudinal current (current flowing into the tip terminal 237 and into the ring terminal 239) in the instant invention by swapping the connections of the nodes 565, 570 of the second amplifier circuit 360. That is, the nodes 565, 570 would connect to the nodes D, C, respectively, of the first amplifier circuit 350.

When the subscriber loop is reverse voltaged, the sourcing circuit 375 of the second amplifier circuit 360 drives the current onto the subscriber line 20, and the sinking circuit 370 of the first amplifier circuit 350 sinks the received current. The fifth current mirror 510 mirrors a current proportional to the current flowing through the second transistor 505 of the sinking circuit 370. As a result, the combination of the third and fourth current mirrors 492, 494 causes a current to flow out of the IMT terminal 275 of the SLIC 30. Likewise, the current mirror 595 of the sourcing circuit 375 of the second amplifier circuit 360 causes a current to flow out of the IMT terminal 275 through the third and fourth current mirrors 492, 494. The combination of the current induced by the sourcing circuit 375 of the second amplifier circuit 360 and the sinking circuit 370 of the first amplifier circuit 350 is added and flows to the ground node.

The instant invention offers several advantages by sensing the current directly from the amplifier circuits 350, 360. First, the instant invention no longer requires sensing resistors to sense current, which means that unnecessary and excessive voltage drops can be avoided with the instant invention. The invention also reduces the noise problems that are often introduced when smaller-size sensing resistors are employed. Since the sensed signals themselves are current signals, these sensed signals can be readily amplified while retaining a good signal-to-noise ratio.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for sensing current in a subscriber line, comprising:

receiving a current signal from a driver capable of driving the current signal on the subscriber line;

generating a second signal in response to receiving the current signal, wherein the second signal is proportional to the current signal;

receiving at least a portion of the current signal from a driver capable of sinking the portion of the current signal from the subscriber line;

generating a third signal in response to receiving at least the portion of the current signal, wherein the third signal is proportional to the portion of the current signal; and adding the second signal and the third signal to generate an output signal.

2. The method of claim 1, wherein generating a second signal includes mirroring a portion of the current signal.

3. The method of claim 2, wherein the second signal is approximately 1/40th of the current signal.

4. The method of claim 1, wherein generating a third signal includes mirroring a current proportional to the portion of the current signal.

5. The method of claim 4, wherein the third signal is approximately 1/40th of the portion of the current signal.

6. The method of claim 1, wherein the output signal is longitudinal current.

7. The method of claim 1, further including adjusting a DC feed to the subscriber line based on the output signal.

8. A circuit for sensing current in a subscriber line, comprising:
- an output driver adapted to drive a current signal on the subscriber line;
- first circuitry coupled to the output driver and adapted to generate a second signal in response to receiving the current signal, wherein the second signal is proportional to the current signal;
- second circuitry adapted for receiving at least a portion of the current signal;
- third circuitry coupled to the second circuitry and adapted to generate a third signal in response to receiving at least the portion of the current signal, wherein the third signal is proportional to the portion of the current signal; and
- fourth circuitry capable of adding the second signal and the third signal to generate an output signal.

9. The circuit of claim 8, wherein the first circuitry includes a first current mirror and wherein the first current mirror generates the second signal by mirroring a portion of the current signal.

10. The circuit of claim 9, wherein the second signal is approximately 1/40th of the current signal.

11. The circuit of claim 8, wherein the second circuitry includes a current sink circuit and wherein the current sink circuit sinks at least the portion of the signal.

12. The circuit of claim 8, wherein the third circuitry includes a second current mirror and wherein the second current mirror generates the third signal by mirroring a portion of the current signal that is sunk by the current sink circuit.

13. The circuit of claim 8, wherein the output signal is a longitudinal current.

14. A line card, comprising:
- a subscriber line interface circuit, comprising:
  - an output driver adapted to drive a current signal on a subscriber line;
  - first circuitry coupled to the output driver and adapted to generate a second signal in response to receiving the current signal, wherein the second signal is proportional to the current signal;
  - second circuitry adapted for receiving at least a portion of the current signal;
  - third circuitry coupled to the second circuitry and adapted to generate a third signal in response to receiving at least the portion of the current signal, wherein the third signal is proportional to the portion of the current signal;
  - fourth circuitry capable of adding the second signal and the third signal to generate an output signal; and
- a subscriber line audio-processing circuit coupled to the subscriber line interface circuit and adapted to receive the output signal for processing.

15. The line card of claim 14, wherein the first circuitry includes a first current mirror and wherein the first current mirror generates the second signal by mirroring a portion of the current signal.

16. The line card of claim 14, wherein the second circuitry includes a current sink circuit and wherein the current sink circuit sinks at least the portion of the signal.

17. The line card of claim 14, wherein the third circuitry includes a second current mirror and wherein the second current mirror generates the third signal by mirroring a portion of the current signal that is sunk by the current sink circuit.

18. The line card of claim 14, wherein the subscriber line audio-processing circuit adapted to process the output signal includes the subscriber line audio-processing adapted to perform loop supervision functions based on the output signal.

19. The line card of claim 14, wherein the subscriber line audio-processing circuit adapted to process the output signal includes the subscriber line audio-processing adapted to perform DC feed control based on the output signal.

20. A circuit for sensing current in a subscriber line, comprising:
- means for receiving a current signal from a driver capable of driving the current signal on the subscriber line;
- means for generating a second signal in response to receiving the current signal, wherein the second signal is proportional to the current signal;
- means for receiving at least a portion of the current signal from a driver capable of sinking the portion of the current signal from the subscriber line;
- means for generating a third signal in response to receiving at least the portion of the current signal, wherein the third signal is proportional to the portion of the current signal; and
- means for adding the second signal and the third signal to generate an output signal.

21. A method comprising:
- sensing a current from a sourcing driver coupled to a subscriber loop;
- scaling the sensed current from the sourcing driver by a first preselected factor to produce a first output signal;
- sensing a current from a sinking driver coupled to the subscriber loop;
- scaling the sensed current from the sinking driver by a second preselected factor to produce a second output signal; and
- combining the first output signal and the second output signal.

22. The method of claim 21, wherein scaling the sensed signal to produce a first output signal comprises mirroring a portion of the current signal from the sourcing driver.

23. The method of claim 21, wherein scaling the sensed current from the sourcing driver comprises scaling the sensed current from the sourcing driver by the first preselected factor of 1/40.

24. The method of claim 21, wherein the combined signal comprises longitudinal current.

25. The method of claim 21, further comprising adjusting a DC feed to the subscriber line based on the combined signal.

* * * * *